US008088300B2

(12) United States Patent
Byrne et al.

(10) Patent No.: US 8,088,300 B2
(45) Date of Patent: Jan. 3, 2012

(54) STABILIZED COMPOSITION FOR PRODUCING CHLORINE DIOXIDE

(75) Inventors: John Byrne, Edison, NJ (US); Barry Speronello, Montgomery Township, NJ (US)

(73) Assignee: BASF Corporation, Florham Park, NJ (US)

( * ) Notice: Subject to any disclaimer, the term of this patent is extended or adjusted under 35 U.S.C. 154(b) by 939 days.

(21) Appl. No.: 11/425,561

(22) Filed: Jun. 21, 2006

(65) Prior Publication Data

US 2007/0295936 A1   Dec. 27, 2007

(51) Int. Cl.
*C01B 11/10* (2006.01)
*C01B 11/02* (2006.01)
*C11D 3/395* (2006.01)

(52) U.S. Cl. ........... 252/187.23; 252/187.1; 252/187.21; 252/187.33; 252/187.34; 252/186.25

(58) Field of Classification Search ............. 252/187.21, 252/187.23
See application file for complete search history.

(56) References Cited

U.S. PATENT DOCUMENTS

| 4,044,103 | A | | 8/1977 | Mollard |
| 5,965,264 | A | * | 10/1999 | Barenberg et al. ............ 428/402 |
| 5,974,810 | A | | 11/1999 | Speronello et al. |
| 6,046,243 | A | * | 4/2000 | Wellinghoff et al. ...... 514/772.3 |
| 6,077,495 | A | | 6/2000 | Speronello et al. |
| 6,238,643 | B1 | | 5/2001 | Thangaraj et al. |
| 6,294,108 | B1 | * | 9/2001 | Speronello et al. ...... 252/187.21 |
| 6,379,643 | B1 | * | 4/2002 | Klatte ........................ 423/477 |
| 6,432,322 | B1 | | 8/2002 | Speronello et al. |
| 6,440,900 | B1 | | 8/2002 | Koermer et al. |
| 6,676,850 | B2 | | 1/2004 | Speronello et al. |
| 6,699,404 | B2 | | 3/2004 | Speronello et al. |
| 2002/0058006 | A1 | * | 5/2002 | Klatte ........................ 423/477 |
| 2003/0215381 | A1 | | 11/2003 | Rosenblatt |
| 2004/0135116 | A1 | | 7/2004 | Speronello et al. |
| 2005/0196370 | A1 | * | 9/2005 | Yu et al. ..................... 424/70.13 |
| 2006/0197057 | A1 | * | 9/2006 | Martin ....................... 252/188.1 |
| 2007/0264226 | A1 | * | 11/2007 | Karagoezian et al. ..... 424/78.27 |
| 2008/0031805 | A1 | * | 2/2008 | Bergmann et al. ............ 423/477 |

FOREIGN PATENT DOCUMENTS

| CN | 1444852 A | 10/2003 |
| GB | 608069 | 9/1948 |

OTHER PUBLICATIONS

Office Action mailed Jan. 29, 2010, in Malaysia Patent Application No. PI 20070996, filed Jun. 21, 2007.
Office Action mailed Dec. 7, 2009, in European Patent Application No. 07 798 809.5, filed Jun. 20, 2007.
International Preliminary Report on Patentability mailed Dec. 22, 2008, in PCT/US2007/071648, filed Jun. 20, 2007.
Office Action mailed Aug. 11, 2010, in Chinese Patent Application No. 200780031024.1, filed Jun. 20, 2007.

* cited by examiner

*Primary Examiner* — Joseph D Anthony

(74) *Attorney, Agent, or Firm* — Bernard Lau

(57) ABSTRACT

Disclosed is a stabilized chlorine dioxide generating composition containing an oxy-chlorine salt, an acid source, optionally a free halogen source, and an endothermic agent. The endothermic agent neutralizes heat evolved by exothermic reaction of the oxy-chlorine salt by the endothermic reaction of the endothermic agent. Since the endothermic reaction eliminates and/or mitigates propagation of the exothermic reaction of the oxy-chlorine salt from a localized area through the total mass of the material, the chlorine dioxide generating composition is thereby stabilized during making, storing, or shipping the composition.

26 Claims, No Drawings

STABILIZED COMPOSITION FOR PRODUCING CHLORINE DIOXIDE

TECHNICAL FIELD

The subject invention generally relates to a stabilized chlorine dioxide generating composition and method for producing chlorine dioxide.

BACKGROUND

Chlorine dioxide is known to be a disinfectant as well as a strong oxidizing agent. The bactericidal, algaecidal, fungicidal, bleaching and deodorizing properties of chlorine dioxide also are well known.

Chlorine dioxide in low concentrations such as up to 1,000 ppm is generally useful for the treatment of odors and microbes. Chlorine dioxide is commonly used as a disinfectant or fumigant in a number of applications and environments. Chlorine dioxide may function without the formation of undesirable side products such as chloramines or chlorinated organic compounds that can be produced when elemental chlorine is utilized. Thus, chlorine dioxide is particularly useful, for example, for the control of microbes and/or organic deodorants on and around food products during and after the packaging process. In addition, chlorine dioxide gas is considered to be safe for human contact at the low concentrations that are effective for deodorization and for most antimicrobial applications.

However, the chlorine dioxide gas can be toxic to humans at concentrations greater than 5 ppm, and it can be explosive at partial pressures of above 0.1 atmosphere. Therefore, chlorine dioxide gas is generally not manufactured and shipped under pressure like other industrial gases, and on-site manufacturing methods require not only expensive equipment, but also high levels of operator skill to avoid generating dangerously high concentrations.

SUMMARY

The following presents a simplified summary in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The subject invention relates to a stabilized composition and system that rapidly produce chlorine dioxide when contacted with water. The chlorine dioxide generating composition and system contain an oxy-chlorine salt, an acid source, an optional free halogen source, and an endothermic agent. The subject invention also relates to a method for generating chlorine dioxide. The subject invention employs an endothermic agent to neutralize heat evolved by one or more exothermic reactions which may occur with such compositions by the endothermic reaction of the endothermic agent. Since the endothermic reaction eliminates and/or mitigates propagation of exothermic reaction(s) within such compositions, the chlorine dioxide generating composition is stabilized during making, storing, or shipping the composition prior to use.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Oxy-chlorine salts can be used to generate chlorine dioxide. Oxy-chlorine salts such as sodium chlorite can undergo exothermic thermal decomposition when they are heated above their decomposition temperature. They can also participate in exothermic reaction with other materials, such as carbonaceous or other oxidizable materials, if they are heated above the reaction initiation temperature. These are collectively referred to an exothermic reaction, and the initiation temperature of the exothermic reaction is the exothermic reaction temperature.

When even a small area of such material is heated above its exothermic reaction temperature, it can begin to react exothermically in the heated area. As a result of heat released by the exothermic reaction in the local, heated area, the exothermic reaction can quickly propagate throughout the total mass of the material.

For example, when a composition containing oxy-chlorine salt is being formed into tablet form, exothermic reaction may occasionally occur. During tablet production, a tablet may undergo exothermic reaction due to a local area of high temperature caused, for example, by frictional heating of the tablet side surface as the tablet is ejected from a compression die. The exothermic reaction can then propagate through powder on the surface of the tablet press where it can consume other tablets and possibly even tablet powder in the feed hopper to the tablet press. The undesirable result is loss of tablets and tablet precursor powder, and possibly damage to the tablet press and feed hopper by heat released from the exothermic reaction.

The subject invention employs an endothermic agent associated with an oxy-chlorine salt to neutralize heat evolved by exothermic reaction by the endothermic reaction of the endothermic agent. Since the endothermic reaction eliminates and/or mitigates propagation of the exothermic reaction of the oxy-chlorine salt from a localized area through the total mass of the material, the chlorine dioxide generating composition of the subject invention is thereby stabilized during making, storing, or shipping the composition.

The chlorine dioxide generating composition contains an oxy-chlorine salt, an acid source, an optional free halogen source, and an endothermic agent. The chlorine dioxide generating composition is such that when it contacts water, chlorine dioxide and optional free halogen are generated, thereby producing a solution containing chlorine dioxide and optional free halogen.

The oxy-chlorine salts provide chlorine dioxide when the chlorine dioxide generating composition contacts water. An oxy-chlorine salt can be defined as one or more solid materials containing either a chlorite anion ($ClO_2^-$), a chlorate anion ($ClO_3^-$), or a combination of chlorite and chlorate anions. In particular, the term oxy-chlorine salt can refer to one or more metal salts containing either or both chlorite or chlorate anions. Included in the term oxy-chlorine salt can be the individual salts, combined salts, and mixtures containing any combination of two or more individual and/or combined salts. In one embodiment, the oxy-chlorine salts are water soluble.

Examples of metal chlorites include alkali metal chlorites such as lithium chlorite, sodium chlorite and potassium chlorite; and alkaline earth metal chlorites such as calcium chlorite and magnesium chlorite. In one embodiment, the metal chlorite is sodium chlorite, dry technical grade sodium chlorite containing about 80% by weight of sodium chlorite and 20% by weight of other salts.

Examples of metal chlorates include alkali metal chlorates such as sodium chlorate and potassium chlorate; and alkaline earth metal chlorates such as magnesium chlorate.

The chlorine dioxide generating composition contains a suitable amount of oxy-chlorine salt to generate chlorine dioxide. In one embodiment, the chlorine dioxide generating composition contains about 1 wt. % or more and about 80 wt. % or less of at least one oxy-chlorine salt. In another embodiment, the chlorine dioxide generating composition contains about 3 wt. % or more and about 70 wt. % or less of at least one oxy-chlorine salt. In yet another embodiment, the chlorine dioxide generating composition contains about 5 wt. % or more and about 60 wt. % or less of at least one oxy-chlorine salt.

The chlorine dioxide generating composition contains one or two or more acid sources. In one embodiment, the acid source is a dry solid acid source. Examples of such dry solid acid sources include inorganic acid salts, such as sodium hydrogen sulfate and potassium hydrogen sulfate; salts containing anions of strong acids and cations of weak bases, such as aluminum chloride, aluminum nitrate, cerium nitrate, and iron sulfate; solid acids that can liberate protons into solution when contacted with water, for example a mixture of the acid ion exchanged form of molecular sieve ETS-10 (see U.S. Pat. No. 4,853,202) and sodium chloride; organic acids, such as citric acid and tartaric acid; and mixtures thereof. In one embodiment, the solid acid source is a solid inorganic acid source, for example, sodium hydrogen sulfate.

The chlorine dioxide generating composition contains a suitable amount of acid source to generate a suitable acidic environment to generate chlorine dioxide. In one embodiment, the chlorine dioxide generating composition contains about 1 wt. % or more and about 80 wt. % or less of at least one acid source. In another embodiment, the chlorine dioxide generating composition contains about 3 wt. % or more and about 70 wt. % or less of at least one acid source. In yet another embodiment, the chlorine dioxide generating composition contains about 5 wt. % or more and about 60 wt. % or less of at least one acid source.

In one embodiment, the chlorine dioxide generating composition does not contain the optional free halogen source. In another embodiment, the chlorine dioxide generating composition contains the optional free halogen source, for example, to facilitate generating chlorine dioxide. When the chlorine dioxide generating composition contains the optional free halogen source, the concentration of the free halogen in the resultant solution is:

(a) about less than the concentration of chlorine dioxide in the solution on a weight basis, and the ratio of the concentration of chlorine dioxide to the sum of the concentrations of chlorine dioxide and chlorite anion in the solution is about 0.25:1 by weight or more; or (b) about equal to or greater than the concentration of chlorine dioxide in the solution on a weight basis, and the ratio of the concentration of chlorine dioxide to the sum of the concentrations of chlorine dioxide and chlorite anion in the solution is about 0.50:1 by weight or more.

The optional free halogen source provides free halogen when the chlorine dioxide generating composition contacts water. Free halogen sources can be materials which generate chlorine, bromine, or other halogen in the +1 valence state. Examples of the free halogen source may include dichloroisocyanuric acid and salts thereof such as sodium dichloroisocyanurate and/or the dihydrate thereof (alternatively referred to as the sodium salt of dichloroisocyanuric acid and/or the dihydrate thereof and hereinafter collectively referred to as "NaDCCA"), trichlorocyanuric acid, salts of hypochlorous acid such as sodium, potassium and calcium hypochlorite, bromochlorodimethylhydantoin, dibromodimethylhydantoin and the like.

The chlorine dioxide generating composition may contain a suitable amount of free halogen source to generate free halogen. In one embodiment, the chlorine dioxide generating composition contains about 0 wt. % or more and about 80 wt. % or less of at least one free halogen source. In another embodiment, the chlorine dioxide generating composition contains about 1 wt. % or more and about 70 wt. % or less of at least one free halogen source. In yet another embodiment, the chlorine dioxide generating composition contains about 5 wt. % or more and about 60 wt. % or less of at least one free halogen source.

The endothermic agents can participate in an endothermic transformation, thereby absorbing heat evolved by the exothermic reaction of the oxy-chlorine salt. Upon receiving heat, the endothermic agents may participate in at least one of (a) melting, (b) vaporization, (c) decomposition, (d) crystalline phase change, (e) particle breakdown, and (f) dissolution. These transformations are collectively referred to as an endothermic transformation. The endothermic agents can participate in one or more endothermic transformations as they are heated.

The endothermic agents may contain one or more solid materials, liquid materials, or a combination of solid and liquid materials. Liquid endothermic agents may be absorbed in the pore structure of the solid constituents of the chlorine dioxide generating composition.

The endothermic transformation absorbs heat evolved by the exothermic reaction of the oxy-chlorine salt (i.e., heat absorbing transformation). In one embodiment, the endothermic agents can undergo melting as an endothermic transformation. In another embodiment, the endothermic agents can undergo an endothermic decomposition; often accompanied by vaporization of at least a portion (e.g., water of hydration) of the endothermic agents.

Materials which participate in the endothermic transformation can readily be identified using common analytical techniques such as differential scanning calorimetry (DSC) and differential thermal analysis (DTA). DSC or DTA can show a temperature of a maximum endothermic peak (i.e., endothermic peak temperature) and/or an amount of endotherm of sample materials by providing heat profile of the sample during heating the sample. The endothermic agent may participate in the endothermic transformation at specific temperatures (i.e., endothermic transformation temperatures).

The endothermic transformation temperature of the endothermic agent may be at about the peak temperature which would be reached during an exothermic reaction of the oxy-chlorine salt in the absence of the endothermic transformation or lower. The endothermic transformation temperature may be at about the maximum storage and/or use temperature of the chlorine dioxide generating composition or higher. In one embodiment, the endothermic transformation temperature is about 30 degrees Celsius or more and 650 degrees Celsius or less. In another embodiment, the endothermic transformation temperature is about 50 degrees Celsius or more and 600 degrees Celsius or less. In yet another embodiment, the endothermic transformation temperature is about 70 degrees Celsius or more and 450 degrees Celsius or less.

For example, in one embodiment, the endothermic agent has an endothermic peak at a temperature of about 30 degrees Celsius or more and 650 degrees Celsius or less. In another embodiment, the endothermic agent has an endothermic peak at a temperature of about 50 degrees Celsius or more and 600 degrees Celsius or less. In yet another embodiment, the endothermic agent has an endothermic peak at a temperature of about 70 degrees Celsius or more and 450 degrees Celsius or less.

The endothermic agent has a sufficient amount of endotherm to eliminate and/or mitigate the progression of exothermic reaction of the oxy-chlorine salt. Endothermic agent having relatively smaller endothermic transformation (such as those exhibited by compounds which only undergo melting transformation) may be used in greater amounts in the chlorine dioxide generating composition (e.g., 5% by weight or more). Endothermic agent having relatively larger endothermic transformation (such as those exhibited by hydrated materials) may be used in smaller amounts in the chlorine dioxide generating composition (e.g., as little as 0.1% by weight).

In one embodiment, the endothermic agent has, in a differential scanning calorimetric analysis using a Netzsch Jupiter model 449C thermal analyzer using a Type E thermocouple holder, an endotherm of about −0.1 micro V/mg or more and −100 micro V/mg or less. In another embodiment, the endothermic agent has, in a differential scanning calorimetric analysis, an endotherm of about −1 micro V/mg or more and −80 micro V/mg or less. In yet another embodiment, the endothermic agent has, in a differential scanning calorimetric analysis, an endotherm of about −5 micro V/mg or more and −70 micro V/mg or less.

The endothermic agent may also exhibit one or more exothermic transformations. In the event that the endothermic agent exhibits exothermic transformation, the magnitude of its endothermic transformation (in terms of heat release) should be larger than the size of its exothermic transformation.

Examples of solid endothermic agents which undergo endothermic melting transformation may include anhydrous alkali metal phosphates such as sodium dihydrogen phosphate ($NaH_2PO_4$), trisodium phosphate ($Na_3PO_4$), and potassium dihydrogen phosphate ($KH_2PO_4$); anhydrous ammonium phosphates such as ammonium dihydrogen phosphate ($NH_4H_2PO_4$); and anhydrous borate salts such as sodium borate. The size of the endothermic transformations are generally smaller for agents which experience primarily melting transformation. Consequently, agents which exhibit primarily melting transformation can be used in amounts of 5 wt. % or more of the overall composition.

Examples of solid endothermic agents which undergo endothermic vaporization transformation and/or endothermic decomposition transformation may include hydrated phosphate salts such as sodium dihydrogen phosphate dihydrate ($NaH_2PO_4.2H_2O$), potassium dihydrogen phosphate dihydrate ($KH_2PO_4.2H_2O$), and calcium phosphate monohydrate ($Ca(H_2PO_4)_2.H_2O$); hydrated chloride salts such as magnesium chloride hexahydrate ($MgCl_2.6H_2O$) and calcium chloride dihydrate ($CaCl_2.2H_2O$); and hydrated sulfate salts such as calcium sulfate dihydrate ($CaSO_4.2H_2O$) and magnesium sulfate heptahydrate ($MgSO_4.7H_2O$). The size of the endothermic transformations are generally larger for agents which experience primarily vaporization or chemical breakdown transformation. Consequently, agents which exhibit vaporization or chemical breakdown transformation may be used in amounts of as little as 0.1 wt. % of the overall composition.

Examples of liquid endothermic agents may include low molecular weight silicone oils, oxidation resistant fluorocarbon oils and any liquids which vaporize or otherwise participate in endothermic transformation but do not cause excessive premature release of chlorine dioxide or otherwise result in incompatibility with the composition.

The chlorine dioxide generating composition contains an effective amount of the endothermic agent to eliminate and/or mitigate the propagation of the exothermic reaction of the oxy-chlorine salt. The amount of the endothermic agent generally depends upon many factors, for example, the particular combination of ingredients in the chlorine dioxide generating composition, the magnitude of the exothermic reaction, the desired degree of suppression of the exothermic reaction, the temperatures to which the chlorine dioxide generating composition is exposed during making, storing, or shipping the composition, and the like. Endothermic agent having relatively smaller endothermic transformation may be used in greater amounts in the composition (e.g., 5% by weight or more). Endothermic agent having relatively larger endothermic transformation may be used in smaller amounts (e.g., as little as 0.1% by weight).

In one embodiment, the chlorine dioxide generating composition contains about 0.1 wt. % or more and about 90 wt. % or less of the endothermic agent. In another embodiment, the chlorine dioxide generating composition contains about 1 wt. % or more and about 80 wt. % or less of the endothermic agent. In yet another embodiment, the chlorine dioxide generating composition contains about 5 wt. % or more and about 70 wt. % or less of the endothermic agent. In yet another embodiment, the chlorine dioxide generating composition contains about 10 wt. % or more and about 50 wt. % or less of the endothermic agent. In still yet another embodiment the chlorine dioxide generating composition contains about 25 wt. % or more and about 75% wt. % or less of the endothermic agent.

When the chlorine dioxide generating composition is contacted with even a small amount of free water, for example, vapor water (i.e., moisture), the chlorine dioxide generating composition may react and start generating chlorine dioxide. That is, the chlorine dioxide generating composition may be moisture sensitive. If the chlorine dioxide generating composition releases too much chlorine dioxide prior to use, the chlorine dioxide generating composition is useless subsequently. Thus, the ingredients of the chlorine dioxide generating composition may not provide undesirable water in the chlorine dioxide generating composition at temperatures experienced prior to use of the composition.

The chlorine dioxide generating composition contains substantially no free water or relatively low concentration of free water so that the chlorine dioxide generating composition does not substantially provide water to generate an excessive amount of chlorine oxide in the chlorine dioxide generating composition at storage temperatures during making, storing, or shipping the composition prior to use. Free water is non-hydrated water that is not bound with the ingredients. Free water may contain absorbed water and adsorbed water. In one embodiment, the chlorine dioxide generating composition contains about 1 wt. % of free water or less. In another embodiment, the chlorine dioxide generating composition contains about 0.7 wt. % of free water or less. In yet another embodiment, the chlorine dioxide generating composition contains about 0.5 wt. % of free water or less.

One or more ingredients of the chlorine dioxide generating composition may be dried by substantially any suitable means prior to mixing so that the chlorine dioxide generating composition contains, for example, about 1 wt. % of free water or less at storage temperatures. Examples of drying means include desiccation, freeze drying, heat drying, vacuum drying, solvent extraction drying, critical point drying, and the like. In one embodiment, one or more ingredients of the chlorine dioxide generating composition are dried by contact with a dry gas such as air.

Endothermic agents can contain a suitable amount of water of hydration for endothermic transformations such as endothermic vaporization, endothermic decomposition, and the like. In one embodiment, the endothermic agents contain a substantial amount of water of hydration so that the chlorine dioxide generating composition contains about 0.1 wt. % of water of hydration or more and about 10 wt. % of water of hydration or less. In another embodiment, the endothermic agents contain a substantial amount of water of hydration so that the chlorine dioxide generating composition contains about 0.5 wt. % of water of hydration or more and about 8 wt. % of water of hydration or less. In yet another embodiment, the endothermic agents contain a substantial amount of water of hydration so that the chlorine dioxide generating composition contains about 1 wt. % of water of hydration or more and about 7 wt. % of water of hydration or less.

The endothermic agent may be dried to remove extra free water, if desired, under suitable conditions before the endothermic agent is combined with the oxy-chlorine salt. The drying conditions generally depend upon, for example, the water content of the endothermic agent, how easy excess water is removed or released from the endothermic agent, and/or how easy the resultant chlorine dioxide generating composition reacts to generate chlorine dioxide by contact with water. The endothermic agent may be dried at a suitable temperature for a suitable time to facilitate removing any extra water in the endothermic agent. In one embodiment, the endothermic agent is dried at a temperature of about 50 degrees Celsius or more and about 650 degrees Celsius or less and for about 10 minutes or more and about 2 days or less. In another embodiment, the endothermic agent is dried at a temperature of about 70 degrees Celsius or more and about 600 degrees Celsius or less and for about 30 minutes or more and about 1 day or less. In yet another embodiment, the endothermic agent is dried at a temperature of about 90 degrees Celsius or more and about 350 degrees Celsius or less and for about 1 hour or more and about 15 hours or less.

It is to be appreciated that the chlorine dioxide generating composition may be in any suitable form. The chlorine dioxide generating composition may be in form of fiber, powder, flake, particle, granule, pellet, and/or tablet. The chlorine dioxide generating composition may be compressed to provide a solid form. In one embodiment, the chlorine dioxide generating composition may be compressed to provide a porous solid form.

Substantially any suitable shape of the solid form may be employed. Examples of shapes of the compressed composition include cylindrical, spherical, oval, disc, plugs, cubes, rectangles, and conical of any size consistent with, for example, a particular application of the chlorine dioxide generating composition. The porous solid form can contain a mixture of granular particulate ingredients of the chlorine dioxide generating composition wherein the size of the granular particles is substantially smaller than the size of the solid form.

The solid form of the chlorine dioxide generating composition may be formed by substantially any suitable method, such as tableting, briquetting, extrusion, sintering, granulating, and the like. In one embodiment, the solid form of the chlorine dioxide generating composition is formed by compression, also known as tableting.

When the chlorine dioxide generating composition is in tablet form, a very high conversion rate of chlorite anion and/or chlorate anion to chlorine dioxide may be obtained upon contact with water. Especially when the chlorine dioxide generating composition is in tablet form having pore structures, a very high conversion rate of the chlorite anion and/or chlorate anion to chlorine dioxide may be obtained upon contact with water. Thus, when the equivalent weights of tablet ingredients in powdered form are added to a given volume of water as the corresponding tablet, a much larger amount of chlorine dioxide is produced by the tablet compared to the powder. Reasonable variations in stirring rate and/or water temperature may have little to no effect on this result.

Although not wishing to be bound by theoretical considerations, it is believed that the very high conversion rate of chlorite anion and/or chlorate anion to chlorine dioxide resulting from the use of the tablets occurs because the tablets can either contain or develop a pore structure. Such pore structure facilitates the penetration of water therein, thereby dissolving ingredients into solution within the pores and producing advantageous conditions for the conversion of chlorite anion and/or chlorate anion to chlorine dioxide within the pores. When water contacts the tablet, the water may penetrate into the pore structure of the tablet and dissolve soluble ingredients from the tablet and thereby form a substantially saturated acidic solution of chlorite anion and/or chlorate anion within the pores. Consequently, the conversion rate of chlorite anion and/or chlorate anion to chlorine dioxide is high.

The conversion rate of chlorite anion and/or chlorate anion to chlorine dioxide under acidic conditions generally is of a very high order in both the concentration of chlorite anion and/or chlorate anion, and acidity. Increasing those concentrations within the pores dramatically increases the rate of chlorine dioxide formation. Nevertheless, despite the high rate of chlorine dioxide formation, a pore network may remain intact for a sufficient period of time to allow the conversion reaction to proceed to the desired degree. Once the ingredients (i.e., an oxy-chlorine salt, an acid source, and/or an optional free halogen source) dissolve into solution, the further conversion of chlorite anion and/or chlorate anion to chlorine dioxide generally is very small.

The pore size and pore volume ranges required to facilitate the desired degree of conversion of chlorite anion and/or chlorate anion to chlorine dioxide generally depend upon many factors, for example, the particular combination of ingredients in the solid chlorine dioxide generating composition, the size of the solid chlorine dioxide generating composition, the form and/or shape of the solid chlorine dioxide generating composition, the temperature of the water, other chemicals dissolved in the water, the desired degree of conversion of chlorite anion and/or chlorate anion to chlorine dioxide, and the like. Accordingly, the solid chlorine dioxide generating composition can have suitable pore size and pore volume ranges to achieve a desired result depending upon these factors.

It is to be appreciated that substantially any suitable methods or tools can be employed to obtain the suitable pore size and pore volume of the solid chlorine dioxide generating composition. For example, the pore size and pore volume may be varied by varying the particle size of the ingredient powders used to prepare a solid chlorine dioxide generating composition such as a tablet, by varying the compaction force used to form the solid chlorine dioxide generating composition, or by varying both the particle size and the compaction force. Larger particles of powder generally produce larger pores and more pores in the solid chlorine dioxide generating composition. Increasing compaction force generally reduces both the size and volume of the pores in the solid chlorine dioxide generating composition.

The chlorine dioxide generating composition may produce a highly converted solution of chlorine dioxide. The chlorine dioxide generating composition in tablet form and particularly in porous tablet form can produce a highly converted solution of chlorine dioxide. In one embodiment, the conversion ratio of chlorite anion and/or chlorate anion to chlorine dioxide is about 0.25 or more. In another embodiment, the conversion ratio is about 0.5 or more. In yet another embodiment, the conversion ratio is about 0.6 or more. In still yet another embodiment, the conversion ratio is about 0.7 or more. The term "conversion ratio," when utilized herein, means the calculated weight ratio of the free chlorine dioxide concentration in the resultant solution to the sum of free chlorine dioxide plus chlorite ion and chlorate ion concentrations in the resultant solution.

The chlorine dioxide generating composition may rapidly produce a chlorine dioxide solution. The chlorine dioxide generating composition in tablet form and particularly in porous tablet form can rapidly produce a chlorine dioxide solution. In one embodiment, the chlorine dioxide generating composition produces a chlorine dioxide solution in about 8 hours or less. In another embodiment, the chlorine dioxide generating composition produces a chlorine dioxide solution in about 2 hours or less. In yet another embodiment, the chlorine dioxide generating composition produces a chlorine dioxide solution in about 1 hour or less.

The chlorine dioxide generating composition can produce the chlorine dioxide solution in a safe and controlled manner. The chlorine dioxide generating composition can produce the chlorine dioxide solution in an economical manner by using tap water. In one embodiment, the concentration of chlorine dioxide in the resultant solution is about 0.1 ppm or more and about 1,000 ppm or less. In another embodiment, the concentration of chlorine dioxide in the resultant solution is about 0.2 ppm or more and about 500 ppm or less. In yet another embodiment, the concentration of chlorine dioxide in the resultant solution is about 0.5 ppm or more and about 200 ppm or less.

In one embodiment, the resultant chlorine dioxide solution has a generally neutral pH. In another embodiment, the pH of the resultant chlorine dioxide solution is about a pH normally required to form substantial concentrations of free chlorine dioxide in solution (i.e., pH of about 2) or higher and about a pH at which chlorine dioxide may start to degrade in solution (i.e., pH of about 12) or lower. In yet another embodiment, the pH of the resultant chlorine dioxide solution is about 4 or higher and about 9 or lower, for example, to minimize the potential corrosion of materials with which the solution comes into contact. In still yet another embodiment, the pH of the resultant chlorine dioxide solution is about 5 or higher and about 9 or lower. In another embodiment, the pH of the resultant chlorine dioxide solution is about 7. In certain cases, it may be advantageous to produce chlorine dioxide in a solution that is already at either a higher or a lower pH than the pH of about 7.

The chlorine dioxide generating composition may be used to deliver chlorine dioxide into such solutions without materially changing the pH of the solution when the chlorine dioxide concentration is at typical use levels. For example, if the chlorine dioxide generating composition is used to produce chlorine dioxide in a typical laundry detergent solution, it may be advantageous for the detergent solution to be at alkaline pH (i.e., pH of higher than about 9) where the detergent functions well. When the chlorine dioxide generating compositions are used for the laundry detergent solution, the pH of the resultant detergent/chlorine dioxide solution may be about 9 or higher to retain detergent characteristics and about 12 or lower since chlorine dioxide may start to degrade at a pH higher than about 12.

In one embodiment, the resultant chlorine dioxide solution does not contain substantially any free chlorine or other free halogen. In another embodiment, the concentration of free chlorine or other free halogen in the resultant chlorine dioxide solution is about greater than the concentration of chlorine dioxide on a weight basis. In another embodiment, the concentration of free chlorine or other free halogen in the resultant chlorine dioxide solution is about the concentration of chlorine dioxide in the solution on a weight basis or less. In yet another embodiment, the concentration of free chlorine or other free halogen in the resultant chlorine dioxide solution is about 50% of the concentration of chlorine dioxide in the solution on a weight basis or less. In still yet another embodiment, the concentration of free chlorine or other free halogen in the resultant chlorine dioxide solution is about 25% of the concentration of chlorine dioxide in the solution on a weight basis or less. In another embodiment, the concentration of free chlorine or other free halogen in the resultant chlorine dioxide solution is about 10% of the concentration of chlorine dioxide in the solution on a weight basis or less.

In one embodiment, the free halogen concentration of the resultant chlorine dioxide solution is relatively low since the free halogen can lead to corrosion of materials in which the solution comes into contact, and free halogen may react with organic materials to produce potentially toxic halogenated hydrocarbons. Because of the ability of the chlorine dioxide generating compositions to produce highly converted solutions of chlorine dioxide, it is possible to use sufficiently low amounts of a free halogen source in the tablet formulation to accelerate the chlorine dioxide formation reaction without contributing excessive amounts of free halogen to the resultant chlorine dioxide solution. In this embodiment the chlorine dioxide generating composition may contain no free halogen source.

In another embodiment, the resultant chlorine dioxide solution contains a relatively high concentration of chlorine or other free halogen. In such situations, the chlorine dioxide generating compositions can be employed to produce very highly converted aqueous solutions of chlorine dioxide where the ratio of the concentration of chlorine dioxide in solution to the sum of the concentrations of chlorine dioxide, and chlorite anion and/or chlorate anion is about 0.5 on a weight basis or higher. In those cases, the concentration of chlorine or free halogen in solution is equal to or even greater than the concentration of chlorine dioxide in solution on a weight basis.

All forms of the chlorine dioxide generating compositions and especially the tablet form of chlorine dioxide generating compositions may, if desired, contain an optional compound, that may be useful, for example, to assist in solid chlorine dioxide generating composition forming processes (e.g., tableting process), to improve the physical or aesthetic characteristics of the resultant solid chlorine dioxide generating compositions such as tablets, to assist volatilization of solid chlorine dioxide generating composition, and to improve a yield of chlorine dioxide obtained. Examples of such compounds include fillers such as attapulgite clay and sodium chloride; tableting and tablet die lubricants; stabilizers; dyes; anti-caking agents; desiccating filling agents such as calcium chloride and magnesium chloride; pore forming agents such as a swelling inorganic clay, e.g., Laponite clay available from Southern Clay Products, Inc.; framework formers that can react with one or more other ingredients in the formulation to produce a low solubility porous framework structure in which the chlorine dioxide generation reactions may proceed; and effervescing agents such as sodium bicarbonate.

The solid form of the chlorine dioxide generating composition may be substantially soluble, slowly soluble, or not fully soluble in water. In one embodiment, the substantially soluble solid form of chlorine dioxide generating composition contains substantially soluble ingredients. For example, the substantially soluble solid form of chlorine dioxide generating composition contains substantially soluble powdered sodium chlorite, a substantially soluble powdered acid source such as sodium hydrogen sulfate, an optional substantially soluble free halogen source, and a substantially soluble endothermic agent. The mixture of these compounds may be compressed in a tablet die at a force sufficient to produce a substantially intact tablet, typically about 1,000 lb/in$^2$ or more and about 10,000 lb/in$^2$ or less. The resultant tablets are stable during storage as long as they are initially sufficiently dry and subsequently protected from exposure to water (either liquid or vapor). The tablets rapidly produce a highly converted solution containing chlorine dioxide when immersed in water.

The slowly soluble solid form of the chlorine dioxide generating composition or not fully soluble solid form of the chlorine dioxide generating composition may have slowly soluble or low soluble porous framework structure in which the chlorine dioxide generation reactions may proceed to substantial completion prior to dissolution of the porous framework. Generally the slowly soluble solid form of the chlorine dioxide generating composition and not fully soluble solid form of the chlorine dioxide generating composition convert a greater proportion of their chlorite anion and/or chlorate anion precursors to chlorine dioxide compared to the fully soluble tablets described above. It is believed that this high yield conversion occurs because the slowly soluble or low solubility porous framework provides a suitable environment for the chlorine dioxide generation reactions to proceed until substantial exhaustion of the reactants.

The slowly soluble solid form of chlorine dioxide generating composition and not fully soluble solid form of chlorine dioxide generating composition may contain, for example, powdered sodium chlorite, powdered sodium hydrogen sulfate as an acid source, an optional NaDCCA, an endothermic agent, and a desiccating filling agent such as anhydrous calcium chloride and anhydrous magnesium chloride. The slowly soluble solid form of chlorine dioxide generating composition and not fully soluble solid form of chlorine dioxide generating composition may contain a dry powdered clay such as Laponite clay to even further improve the yield and rate of production of the chlorine dioxide. The mixture of these compounds may be compressed in a tablet die at a force sufficient to produce a substantially intact tablet, typically about 1,000 lb/in$^2$ or more and about 10,000 lb/in$^2$ or less. The resultant tablets are stable during storage as long as initially sufficiently dry and subsequently they are protected from exposure to water (either liquid or vapor). They rapidly produce a highly converted solution of free chlorine dioxide when immersed in water.

The slowly soluble or low soluble porous framework of the solid form chlorine dioxide generating composition may contain a framework former. The framework former does not substantially provide water to the chlorine dioxide generating composition prior to use. For example, the framework former may be an absolute or anhydrous compound. Examples of the framework former may include a low solubility compound such as anhydrous calcium sulfate, calcium phosphate, aluminum phosphate, magnesium phosphate, ferric sulfate, ferric phosphate and zinc phosphate; a low soluble amorphous material such as silica-alumina gel, silica-magnesia gel, silica-zirconia gel, and silica gel; a clay such as Laponite clay; and the like.

The slowly soluble or low soluble porous framework can remain substantially undissolved in the resultant chlorine dioxide solution during the period of chlorine dioxide generation. In one embodiment, the porous framework remains wholly intact during the reaction time to generate chlorine dioxide. In another embodiment, the porous framework does not remain wholly intact during the reaction time to form chlorine dioxide. In yet another embodiment, the solid form chlorine dioxide generating composition (e.g., tablet) disintegrates into substantially insoluble (or slowly soluble) granules that release chlorine dioxide into solution. The granules may contain the pore structure since the size of the granules is still large relative to the size of the pores, so the necessary concentrated reaction conditions exist within the pore space within the granules despite the breakdown of the tablet into granules.

The chlorine dioxide generating composition may contain a sufficient amount of framework former to facilitate generation of the chlorine dioxide solution. In one embodiment, the chlorine dioxide generating composition contains about 5 wt. % of framework former or more and about 90 wt. % of framework former or less. In another embodiment, the chlorine dioxide generating composition contains about 7 wt. % of framework former or more and about 80 wt. % of framework former or less. In yet another embodiment, the chlorine dioxide generating composition contains about 10 wt. % of framework former or more and about 70 wt. % of framework former or less.

The chlorine dioxide generating composition may be formed in a solid form such as a tablet in the following manner. The individual chemical components of the tablet formulation may be dried, if desired, prior to use. The desired amount of each component is weighed into a container such as a plastic vial. In the following examples, formulations are given on a weight percent basis. The vial containing all the components of the tablet formulation is shaken to mix the components thoroughly. The chlorine dioxide generating compositions in the vial are emptied into an appropriately sized die (e.g., about 13-mm diameter for about 1 g tablet). The plunger is placed in the die and the chlorine dioxide generating composition is pressed into a tablet using a hydraulic laboratory press at a force of about 2000 lb. The resulting tablet is removed from the die and placed in a closed plastic vial until use.

Tablet performance is measured in the following manner. A tablet is placed in a volumetric flask or container filled with a known amount of tap water. Chlorine dioxide evolution starts immediately or soon as evidenced by the appearance of a yellow color. The tablet is allowed to react until completion. Completion of the reaction depends, in part, on the tablet type and size. Typically the reaction time is 2 hours or less if a 1 g tablet is partially insoluble, and 0.5 hours if a 1 g tablet is completely soluble. When reaction is complete, the flask/container is shaken or stirred in order to mix the contents. Then the contents are analyzed. Typically, chlorine dioxide is measured by uv-vis spectrometry, using a Hach model DR2010 spectrophotometer and Hach method 75 available from Hach Company.

Chlorine dioxide, chlorite, chlorate, and chlorine are also measured by titration of chlorine dioxide solution using procedures equivalent to those found in the text, Standard Methods for the Examination of Water and Wastewater, 19th Edition (1995) pages 4-57 and 4-58. This text is published jointly by the American Public Health Association, the American Water Works Association and the Water Environment Federation. The publication office is American Public Health Association, Washington, D.C. 20005.

Total oxidants (i.e., chloride dioxide and chlorine) are also measured by titration at pH 7 using either manual titration and a starch indicator or a Brinkmann Autotitration System, 716 DMS Titrino® available from Brinkmann Instruments, Inc. equipped with a massive platinum electrode. The method is an iodimetric titration at pH 7 (i.e., based on the oxidation of iodide to iodine) and its subsequent reaction with the titrant, sodium thiosulfate. The typical procedure of the iodimetric titration is as follows. One hundred milliliters of chlorine dioxide solution and a stirring bar are placed in a beaker and 2 g of potassium iodide (Reagent Crystals) and 10 ml of a 1N solution of sulfuric acid (Mallinckrodt) are added with stirring. The resulting solution is titrated with 0.1 N thiosulfate solution (Aldrich Chemical Co.). The endpoint is determined either automatically by the Brinkmann Titrino software or visually using a starch endpoint indicator color change from blue to clear. This endpoint is used to calculate the concentration of total oxidants in the sample. The pH of the original chlorine dioxide solution is measured using a pH electrode either on the solution "as is" and/or diluted with sufficient water to give approximately a 10 ppm concentration of chlorine dioxide.

The following examples illustrate the subject invention. Unless otherwise indicated in the following examples and elsewhere in the specification and claims, all parts and percentages are by weight, all temperatures are in degrees Celsius, and pressure is at or near atmospheric pressure.

In the following examples, technical grade sodium chlorite is used. Typically the actual sodium chlorite content of the technical grade sodium chlorite is approximately 80% and the remainder is approximately sodium chloride (8.5%), sodium carbonate (6.1%) and sodium sulfate (4.5%). A wt. yield of chlorine dioxide is calculated based on the tablet weight, i.e., wt. % yield=100×(wt. $ClO_2$/wt. tablet).

EXAMPLE 1

Example 1 shows determination of endothermic peak temperatures of endothermic agents. Each of the following powders are tested for endothermic and exothermic reactions as a function of temperature using simultaneous TGA (thermogravimetric analysis) and DSC: calcium chloride dihydrate, magnesium sulfate heptahydrate, magnesium chloride hexahydrate, calcium dihydrogen phosphate monohydrate, ammonium dihydrogen phosphate, sodium dihydrogen phosphate, and potassium dihydrogen phosphate. Samples weighing about 20 mg are heated at a rate of 10 degrees Celsius/min from room temperature to 400 degrees Celsius in dry flowing air. The testing instrument is Netzsch Jupiter model 449C thermal analyzer operating in DSC mode using a Type E thermocouple holder available from Netzsch Instruments, Inc.

Calcium chloride dihydrate shows a smaller endothermic peak of about −15 micro V/mg at about 140 degrees Celsius and a larger endothermic peak of −45 micro V/mg at about 170 degrees Celsius. Calcium dihydrogen phosphate monohydrate shows two larger and one smaller endothermic peaks of about −18 micro V/mg at about 180 degrees Celsius, about −17 micro V/mg at about 260 degrees Celsius, and about −5 micro V/mg at about 195 degrees Celsius, respectively. Ammonium dihydrogen phosphate shows a single endothermic peak of about −5 micro V/mg between about 180 and 215 degrees Celsius, and a single larger exothermic peak between about 250 and 300 degrees Celsius. Sodium dihydrogen phosphate shows a single very small endothermic peak (estimated at about −1 micro V/mg) beginning at about 180 degrees Celsius. Potassium dihydrogen phosphate shows a single, but ragged, endothermic peak of about −3.5 micro V/mg beginning at about 190 degrees Celsius and ending at about 240 degrees Celsius. Magnesium sulfate heptahydrate shows a single large endothermic peak of about −50 micro V/mg and 2 smaller endothermic peaks of about −5 micro V/mg over the temperature range of about 120 to 275 degrees Celsius. Magnesium chloride hexahydrate shows a broad overlapping series of endothermic peaks of about −10 to about −25 micro V/mg between about 120 and 300 degrees Celsius.

EXAMPLE 2

Example 2 shows that compositions containing properly dried calcium chloride dihydrate have a satisfactorily low rate of premature release of chlorine dioxide. The compositions contain sodium chlorite, sodium hydrogen sulfate as an acid source, NaDCCA, anhydrous calcium chloride as a framework former, and calcium chloride dihydrate as both an endothermic agent and a framework former. Calcium chloride dihydrate has a small endothermic peak at about 140 degrees Celsius and a larger endothermic peak at about 170 degrees Celsius, as shown in Example 1. Thus, calcium chloride dihydrate that is dried at a temperature below 140 degrees Celsius will retain its waters of hydration while removing absorbed and adsorbed water. Specifically, drying at a temperature between about 75 degrees Celsius and about 105 degrees Celsius provides good conditions for both sufficient drying and retention of enough water of hydration to absorb the heat evolved by the exothermic reactions of oxy-chlorine salts.

One hundred (100) lbs of calcium chloride dihydrate (AIC, Framingham Mass., USP grade 0.10-0.15 mm APS) is loaded into a fluid bed dryer and is fluidized with dry air at a linear velocity of 35 ft/min. The calcium chloride dihydrate is heated to 90 degrees Celsius using manual control. The calcium chloride dihydrate is above 75 degrees Celsius for about 45 minutes prior to reaching 90 degrees Celsius. Samples of about 500 grams of dried calcium chloride dihydrate are collected in glass jars after the following times at 90 degrees Celsius: 15 min, 30 min, 60 min, 90 min, and 120 min. Each sample dried at 90 degrees Celsius is referred to as CCD-15, CCD-30, CCD-60, CCD-90, and CCD-120, respectively.

A portion of each sample is formulated into a composition shown in Table 1 using both fine grade (more reactive) and coarse grade (less reactive) NaDCCA.

TABLE 1

| Composition | 1-F Control | 1-F CCD-15 | 1-F CCD-30 | 1-F CCD-60 | 1-F CCD-90 | 1-F CCD-120 |
|---|---|---|---|---|---|---|
| $NaClO_2$ | 25% | 25% | 25% | 25% | 25% | 25% |
| $NaHSO_4$ | 31% | 31% | 31% | 31% | 31% | 31% |
| NaDCCA (Fine) | 8% | 8% | 8% | 8% | 8% | 8% |
| NaDCCA (Coarse) | | | | | | |
| $CaCl_2$ | 36% | 18% | 18% | 18% | 18% | 18% |
| CCD-15 | | 18% | | | | |
| CCD-30 | | | 18% | | | |
| CCD-60 | | | | 18% | | |
| CCD-90 | | | | | 18% | |
| CCD-120 | | | | | | 18% |

TABLE 1-continued

| Composition | 1-C Control | 1-C CCD-15 | 1-C CCD-30 | 1-C CCD-60 | 1-C CCD-90 | 1-C CCD-120 |
|---|---|---|---|---|---|---|
| NaClO$_2$ | 25% | 25% | 25% | 25% | 25% | 25% |
| NaHSO$_4$ | 31% | 31% | 31% | 31% | 31% | 31% |
| NaDCCA (Fine) | | | | | | |
| NaDCCA (Coarse) | 8% | 8% | 8% | 8% | 8% | 8% |
| CaCl$_2$ | 36% | 18% | 18% | 18% | 18% | 18% |
| CCD-15 | | 18% | | | | |
| CCD-30 | | | 18% | | | |
| CCD-60 | | | | 18% | | |
| CCD-90 | | | | | 18% | |
| CCD-120 | | | | | | 18% |

Some of the above samples are tested for premature release of chlorine dioxide. Thirty grams of the powder composition from each formulation are placed into a 16 oz wide mouth amber glass jar and capped with a lid containing quick connect tubing fittings. The compositions are allowed to remain in the sealed jars overnight (about 16 hrs) and then the chlorine dioxide plus chlorine gas concentration in the headspace of each jar is measured using a Drager tube (type Chlorine 0.2/a). Table 2 shows a concentration of chlorine dioxide plus chlorine in the headspace of the jar (premature release of chlorine dioxide) of the samples.

TABLE 2

| Formulation | Prerelease |
|---|---|
| 1-C Control | 2.5 ppm |
| 1-F Control | 3.33 ppm |
| 1-C CCD-15 | 2.5 ppm |
| 1-C CCD-30 | 2.5 ppm |
| 1-C CCD-60 | 3.75 ppm |
| 1-C CCD-90 | 2.5 ppm |
| 1-C CCD-120 | 2.5 ppm |

All of the compositions tested release chlorine dioxide pre-maturely at a rate that yields a reading of less than 5 ppm in this test. A reading of 5 ppm or less represents satisfactorily low premature release of chlorine dioxide.

EXAMPLE 3

Example 3 shows thermal stability of compositions containing sodium chlorite, sodium hydrogen sulfate as an acid source, NaDCCA, anhydrous calcium chloride as a framework former, and calcium chloride dihydrate as both an endothermic agent and a framework former. The thermal stability of the powder composition of Example 2 is tested in the following manner. 15 grams of each powder composition are evenly spread in the bottom of a shallow, 2" diameter aluminum foil tray (about ⅛" deep). A ¹⁄₃₂" thermocouple is placed into the powder at one edge of the tray and the powder is heated for 30 seconds using the direct flame of a propane torch at a location diametrically opposite the thermocouple. The time is measured between the start of heating and the point of maximum temperature at the thermocouple. The peak temperature is also recorded. Finally, the samples are reweighed after the test to determine the extent of decomposition. If no peak is observed within 3 minutes into the test, the test is terminated. The results are shown in Table 3.

TABLE 3

| Formulation | Peak Temp (degrees Celsius) | Time to Peak | Mass Unreacted Powder, gm |
|---|---|---|---|
| 1-C Control | 42 | — | 8.593 |
| 1-C Control | 42 | — | 5.954 |
| 1-C Control | 42 | — | 10.433 |
| 1-C CCD-15 | 38 | — | 10.923 |
| 1-C CCD-30 | 43 | — | 10.142 |
| 1-C CCD-60 | 44 | — | 10.911 |
| 1-C CCD-90 | 37 | — | 11.796 |
| 1-C CCD-120 | 35 | — | 12.656 |
| 1-F Control | 318.6 | 0:56 | Burned-out |
| 1-F Control | 343.6 | 0:45 | Burned-out |
| 1-F CCD-15 | 34 | — | 12.510 |
| 1-F CCD-15 | 36 | — | 12.511 |
| 1-F CCD-120 | 34 | — | 13.044 |
| 1-F CCD-120 | 32.4 | — | 12.521 |

All of the samples made using calcium chloride dihydrate as an endothermic agent prevent propagation of the decomposition reaction across the tray. All of the calcium chloride dihydrate containing samples have peak temperatures below 45 degrees Celsius and their tests are terminated without a temperature spike at 3 minutes. All of the calcium chloride dihydrate containing samples a have higher weight of unreacted powder than the controls.

EXAMPLE 4

Example 4 shows that tablets made using compositions containing properly dried calcium chloride dihydrate have a satisfactorily low rate of premature release of chlorine dioxide. The compositions contain sodium chlorite, sodium hydrogen sulfate as an acid source, NaDCCA, anhydrous calcium chloride as a framework former, and calcium chloride dihydrate as both an endothermic agent and a framework former. One percent (1%) by weight of dried Carbowax 8000® (Union Carbide) is added to the powder compositions of Example 2 as a die lubricant and binder. 1 gram size tablets are pressed from the powders.

Thirty grams of tablets from each formulation are placed into a 16 oz wide mouth amber glass jar and capped with a lid containing quick connect tubing fittings. The tablets are allowed to remain in the sealed jars overnight (about 16 hrs) and then the chlorine dioxide gas concentration in the headspace of each jar is measured using a Drager tube (type Chlorine 0.2/a). Table 4 shows concentrations of chlorine dioxide plus chlorine in the headspace of the jar (premature release of chlorine dioxide) of the samples.

TABLE 4

| Tabletted Formulation | Prerelease |
|---|---|
| 1-C Control | 5 ppm |
| 1-C CCD-15 | 7.5 ppm |
| 1-C CCD-30 | 7.5 ppm |
| 1-C CCD-60 | 7.5 ppm |
| 1-C CCD-90 | <7.5 ppm |
| 1-C CCD-120 | 5 ppm |

All of the tabletted compositions containing calcium chloride dihydrate result in readings of less than about 7.5 ppm, and are not materially different from the control that contains only anhydrous ingredients.

EXAMPLE 5

Example 5 shows a free oxidant yield of tablet form composition containing sodium chlorite, sodium hydrogen sulfate as an acid source, NaDCCA, anhydrous calcium chloride as a framework former, and calcium chloride dihydrate as both an endothermic agent and a framework former. A single tablet of each formulation of Example 4 is tested for free oxidant yield by reacting the tablet for 1 hour in 1 liter of tap water and determining the free oxidant concentration of the solution using pH 7 buffered Kl/thiosulfate titration (free oxidant is chlorine dioxide plus small amounts of chlorine). The free oxidant yield of each tablet is then calculated by dividing the mass of free oxidant in a solution by the mass of the tablet reacted in that solution (and multiplying by 100%). Table 5 shows the free oxidant concentrations and yields of the samples.

TABLE 5

| Formulation | Tablet Mass (g) | Free Oxidant (ppm) | Wt. % Yield |
| --- | --- | --- | --- |
| 1-C Control | 0.95 | 122 | 12.9% |
| 1-C CCD-15 | 0.86 | 95 | 11.1% |
| 1-C CCD-30 | 1.45 | 132 | 9.1% |
| 1-C CCD-60 | 1.32 | 142 | 10.8% |
| 1-C CCD-90 | 0.72 | 77 | 10.6% |
| 1-C CCD-120 | 0.81 | 88 | 10.9% |

All of the tabletted compositions tested have free oxidant yields of more than about 9% and most have yields near 11% or above.

EXAMPLE 6

Example 6 shows thermal stability of compositions containing sodium chlorite, sodium hydrogen sulfate as an acid source, coarse NaDCCA, anhydrous chloride salts as a framework former, and an endothermic agent. Table 6 shows formulations of the compositions.

TABLE 6

| Composition | 2-S Control | 2-S 1 | 2-G Control | 2-G 1 | 2-G 3 |
| --- | --- | --- | --- | --- | --- |
| $NaClO_2$ | 26% | 26% | 25% | 25% | 25% |
| $NaHSO_4$ | 26% | 26% | 31% | 31% | 31% |
| NaDCCA (Coarse) | 7% | 7% | 8% | 8% | 8% |
| NaCl | 20% | | | | |
| $MgCl_2$ | 21% | 21% | | | |
| $CaCl_2$ | | | 36% | 18% | 18% |
| $MgCl_2.6H_2O$ | | 20% | | | |
| $CaCl_2.2H_2O$ | | | | 18% | |
| $CaSO_4.2H_2O$ | | | | | 18% |

Technical grade (80%) sodium chlorite is dried at 90 degrees Celsius overnight. Powdered sodium hydrogen sulfate is dried overnight at 50 degrees Celsius and then for 2-6 hours at 85 degrees Celsius under flowing nitrogen. Magnesium chloride powder is dried overnight at 160 degrees Celsius. Calcium chloride powder is dried overnight at 250 degrees Celsius. Sodium dichloro-isocyranurate dihydrate powder is dried overnight at about 100-125 degrees Celsius. Powders of the following types are dried overnight at 75 degrees Celsius: magnesium chloride hexahydrate, calcium chloride dihydrate, and calcium sulfate dihydrate.

Powder mixtures of Table 6 are prepared by weighing the respective compounds into glass jars under dry conditions, capping the jars, and then rolling to mix the contents.

Decomposition rates of the powder compositions of Table 6 are tested by evenly spreading 12 grams of the 2-S powders or 15 grams of the 2-G powders in the bottom of a shallow, 2" diameter aluminum foil tray (about ⅛" deep). Two thermocouples are placed into the powder at diametrically opposite edges of the tray. The powder is heated at the location of one of the thermocouples (thermocouple 1) using the direct flame of a butane torch for 2 minutes or until decomposition is complete (evidenced by a sharp rise in the temperature at the opposite thermocouple, thermocouple 2). The time is measured between the start of heating and the point of maximum temperature at thermocouple 2. The peak temperature is also recorded. If no peak is observed after 2 minutes of heating, the test is terminated. The results are shown in Table 7.

TABLE 7

| Formulation | Temperature at Thermocouple 1, degrees Celsius | Peak Temperature at Thermocouple 2, degrees Celsius | Time To Peak Temperature at Thermocouple 2, seconds |
| --- | --- | --- | --- |
| 2-S Control | $\geq 2000$ | 310 | 80 |
| 2-S 1 | $\geq 2000$ | 50 | 120* |
| 2-G Control | $\geq 2000$ | 375 | 60 |
| 2-G 1 | $\geq 2000$ | 65 | 120* |
| 2-G 3 | $\geq 2000$ | 55 | 120* |

*Heating is terminated. Decomposition reaction did not propagate across tray.

The flame of the heat source is at or above 2,000 degrees Celsius, and the two control samples containing all anhydrous ingredients decomposed completely in 80 seconds or less. The temperature at the thermocouple opposite the heat source (thermocouple 2) exceeds 300 degrees Celsius for both control samples.

In contrast, none of the samples containing hydrated salts allows the decomposition reaction to propagate across the tray even after 2 minutes of heating. The peak temperature at thermocouple 2 does not exceed 65 degrees Celsius.

EXAMPLE 7

Example 7 shows the thermal stability of compositions containing sodium chlorite, sodium hydrogen sulfate as an acid source, coarse NaDCCA, framework former(s), and endothermic agent(s). Table 8 shows formulations of the compositions.

TABLE 8

| Composition | 3-S Control | 3-S P | 3-S 1 | 3-S 3 | 3-S 4 | 3-S 5 |
| --- | --- | --- | --- | --- | --- | --- |
| $NaClO_2$ | 26% | 26% | 26% | 26% | 26% | 26% |
| $NaHSO_4$ | 26% | 26% | 26% | 26% | 26% | 26% |
| NaDCCA (Coarse) | 7% | 7% | 7% | 7% | 7% | 7% |
| NaCl | 20% | | | | | |
| $MgCl_2$ | 21% | | | | | |
| $MgSO_4$ | | 21% | 10.5% | 21% | 21% | 21% |
| $NaH_2PO_4$ | | 20% | 20% | 10% | 10% | 10% |
| $MgSO_4.7H_2O$ | | | 10.5% | | | |
| $Ca(H_2PO_4)_2.H_2O$ | | | | 10% | | |
| $NH_4H_2PO_4$ | | | | | 10% | |
| $KH_2PO_4$ | | | | | | 10% |

Technical grade (80%) sodium chlorite is dried at 90 degrees Celsius overnight. Powdered sodium hydrogen sulfate is dried overnight at 50 degrees Celsius and then for 2-6 hours at 85 degrees Celsius under flowing nitrogen. Magnesium chloride powder is dried overnight at 160 degrees Celsius. Magnesium sulfate powder is dried at 300 degrees Celsius. Sodium dihydrogen phosphate is dried for 3 hours at 180 degrees Celsius. Sodium dichloro-isocyranurate dihydrate powder in the form of a coarse granular powder is dried overnight at about 100-125 degrees Celsius.

Powder mixtures of Table 8 are prepared by weighing the respective materials into glass jars under dry conditions, capping the jars, and then rolling to mix the contents.

The decomposition rates of the powders of Table 8 are tested by evenly spreading about 15 grams of the powders in the bottom of a shallow, 2" diameter aluminum foil tray (about 1/8" deep). A thermocouple is placed into the powder at one edge of the tray. The powder is heated using the direct flame of a butane torch at a point diametrically opposite the thermocouple. An initial series of the test is conducted by heating for 30 seconds, and a second series of the test is conducted by heating for 1 minute. Time to peak temperature is measured between the start of heating and the point of maximum temperature at the thermocouple. The peak temperature is also recorded. If no peak is observed after 4 minutes, the test is terminated. The results are shown in Table 9.

TABLE 9

| Composition | Heating Time, min:sec | Peak Temperature at Thermocouple, degrees Celsius | Time To Peak Temperature at Thermocouple, min:sec |
|---|---|---|---|
| 3-S Control | :30 | 313 | 1:50 |
| 3-S Control | :30 | 315 | 1:56 |
| 3-S P | :30 | 33 | — |
| 3-S P | :30 | 39.9 | — |
| 3-S 1 | :30 | 31 | — |
| 3-S 1 | :30 | 34 | — |
| 3-S 3 | :30 | 32 | — |
| 3-S 3 | :30 | 32 | — |
| 3-S 4 | :30 | 197 | 2:10 |
| 3-S 4 | :30 | 216 | 2:08 |
| 3-S 5 | :30 | 40 | — |
| 3-S 5 | :30 | 32 | — |
| 3-S Control | 1:00 | 272 | 1:54 |
| 3-S P | 1:00 | 55 | — |
| 3-S 1 | 1:00 | 39 | 3:25 |
| 3-S 3 | 1:00 | 40 | — |
| 3-S 4 | 1:00 | 205 | 2:00 |
| 3-S 5 | 1:00 | 59 | — |

—: Decomposition reaction did not propagate across tray.

All of the tests done using the control formulation quickly propagate the thermal decomposition reaction across the tray. In all of the controls, the temperature at the thermocouple exceeded 270 degrees Celsius and reached its peak in less than 2 minutes.

In contrast, 3-S 4 propagates the decomposition reaction, but its peak temperature (about 200 degrees Celsius) is well below the control, and it took about 5% longer time to reach the peak temperature.

3-S P, 3-S 1, 3-S 3, and 3-S 5 do not propagate the decomposition reaction with either 30 seconds or 1 minute of heating. The thermocouple readings all increase slightly over room temperature due to heating from the flame and thermal conduction through the aluminum tray, but the decomposition does not sustain a chain reaction away from the hot zone.

With respect to any figure or numerical range for a given characteristic, a figure or a parameter from one range may be combined with another figure or a parameter from a different range for the same characteristic to generate a numerical range.

While the invention has been explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A chlorine dioxide generating composition comprising a mixture of:
   about 5 wt. % to about 60 wt. % of at least one oxy-chlorine salt,
   about 5 wt. % to about 60 wt. % of at least one acid source,
   optionally about 0 wt. % to about 60 wt. % of at least one free halogen source, and
   about 5 wt. % to about 50 wt. % of at least one hydrated solid endothermic agent to mitigate exothermic reaction of the oxy-chlorine salt, wherein the at least one hydrated solid endothermic agent comprises a hydrated chloride salt.

2. The composition of claim 1, wherein the oxy-chlorine salt comprises sodium chlorite.

3. The composition of claim 1, wherein the oxy-chlorine salt comprises sodium chlorate or a combination of sodium chlorate and sodium chlorite.

4. The composition of claim 1, wherein the optional free halogen source comprises a material selected from the group consisting of dichloroisocyanuric acid, a salt of dichloroisocyanuric acid, a hydrated salt of dichloroisocyanuric acid, trichlorocyanuric acid, a salt of hypochlorous acid, bromochlorodimethylhydantoin and dibromodimethylhydantoin.

5. The composition of claim 1, wherein the composition further comprises one or more liquids as an endothermic agent.

6. The composition of claim 1 wherein the composition further comprises an anhydrous solid material as an endothermic agent.

7. The composition of claim 6, wherein the anhydrous solid endothermic agent comprises an anhydrous phosphate salt.

8. The composition of claim 1, wherein the composition further comprises one or more of a silicone oil or a fluorocarbon oil as an endothermic agent.

9. The composition of claim 1, wherein the endothermic agent is capable of participating in at least one of melting, vaporization, decomposition, crystalline phase change, particle breakdown, and dissolution.

10. The composition of claim 1, wherein the endothermic agent is capable of participating in endothermic transformation at about the peak temperature which is reached during an exothermic reaction of the oxy-chlorine salt in the absence of the endothermic agent or lower.

11. The composition of claim 1, wherein the endothermic agent participates in endothermic transformation at about 30 degrees Celsius to 650 degrees Celsius.

12. The composition of claim 1, wherein the endothermic agent has an endotherm of about −0.1 micro V/mg to −100 micro V/mg when tested using a Netzsch Jupiter 449c thermal analyzer operating in DSC mode using a Type E thermocouple holder and heated in dry air at a rate of 10 degrees Celsius/minute.

13. The composition of claim 1, further comprising a framework former.

14. The composition of claim 1, wherein the composition is in at least one of fiber, powder, flake, particle, granule, pellet, and tablet form.

15. The composition of claim 1, wherein the composition is in porous tablet form.

16. The composition of claim 1 wherein the at least one hydrated solid endothermic agent further comprises a hydrated phosphate salt.

17. The composition of claim 1, wherein the composition further comprises at least one endothermic agent selected from the group consisting of ammonium dihydrogen phosphate, sodium borate, sodium dihydrogen phosphate dihydrate, potassium dihydrogen phosphate dihydrate, calcium phosphate monohydrate, magnesium chloride hexahydrate, calcium chloride dihydrate, calcium sulfate dihydrate, and magnesium sulfate heptahydrate.

18. The composition of claim 1, wherein the hydrated chloride salt is calcium chloride dihydrate.

19. The composition of claim 1, comprising about 10 wt. % to about 50 wt. % of the at least one hydrated solid endothermic agent.

20. The composition of claim 18, comprising about 18 wt. % calcium chloride dehydrate.

21. The composition of claim 18, wherein the ratio of oxy-chlorine salt to the at least one hydrated solid endothermic agent is about 1:1.

22. A method for stabilizing a composition for generating a solution comprising chlorine dioxide, comprising:
   combining as a mixture at least one oxy-chlorine salt, at least one acid source, optionally at least one free halogen source, and a suitable amount of an endothermic agent to mitigate heat induced exothermic reaction of the oxy-chlorine salt, wherein the mixture comprises about 5 wt. % to about 60 wt. % of the at least one oxy-chlorine salt, about 5 wt. % to about 60 wt. % of the at least one acid source, optionally about 0 wt. % to about 60 wt. % of the at least one free halogen source, and about 5 wt. % to about 50 wt. % of the at least one hydrated solid endothermic agent wherein the at least one hydrated solid endothermic agent comprises a hydrated chloride salt; and
   wherein the composition generates the solution comprising chlorine dioxide when the composition contacts water.

23. The method of claim 22 further comprising drying at least one of the oxy-chlorine salt, the acid source, the endothermic agent, and optionally the free halogen source before combining.

24. The method of claim 22 further comprising absorbing heat evolved by exothermic reaction of the oxy-chlorine salt by the endothermic agent.

25. A system for generating chlorine dioxide, comprising:
   a chlorine dioxide generating component comprising at least one oxy-chlorine salt, at least one acid source, and optionally at least one free halogen source, the chlorine dioxide generating component generating a solution comprising chlorine dioxide when the chlorine dioxide generating component contacts water; and
   a component for mitigating exothermic reaction of the oxy-chlorine salt comprising at least one hydrated solid endothermic agent, wherein the at least one hydrated solid endothermic agent comprises a hydrated chloride salt, wherein the system comprises about 5 wt. % to about 60 wt. % of the at least one oxy-chlorine salt, about 5 wt. % to about 60 wt. % of the at least one acid source, optionally about 0 wt. % to about 60 wt. % of the at least one free halogen source, and about 5 wt. % to about 50 wt. % of the at least one hydrated solid endothermic agent.

26. The system of claim 25, wherein the system is in porous tablet form.

* * * * *